United States Patent [19]

Pipkins

[11] Patent Number: 4,999,230

[45] Date of Patent: Mar. 12, 1991

[54] PIRN MARKER SHEET AND METHOD FOR FORMING THE SAME

[76] Inventor: Alfred R. Pipkins, 3776 Court Dr., Theodore, Ala. 36582

[21] Appl. No.: 557,019

[22] Filed: Jul. 25, 1990

Related U.S. Application Data

[63] Continuation-in-part of Ser. No. 413,762, Sep. 28, 1989, Pat. No. 4,944,978.

[51] Int. Cl.[5] ................................ B32B 3/10

[52] U.S. Cl. ................................ 428/43; 428/136; 206/820

[58] Field of Search ................ 428/43, 136; 206/820

[56] References Cited

U.S. PATENT DOCUMENTS

| | | | |
|---|---|---|---|
| 4,584,219 | 4/1986 | Baartmans | 428/42 |
| 4,619,851 | 10/1986 | Sasaki et al. | 428/40 |
| 4,661,189 | 4/1987 | Voy et al. | 156/248 |
| 4,690,720 | 9/1987 | Mack | 156/248 |
| 4,944,978 | 7/1990 | Pipkins | 428/43 |

*Primary Examiner*—Alexander S. Thomas
*Attorney, Agent, or Firm*—Sixbey, Friedman, Leedom & Ferguson

[57] ABSTRACT

A sheet of removable pirn markers is provided which may be fed through a printer, and then a row of interconnected pirn markers may be removed from the sheet by pulling outwardly on the first pirn marker in the row. Each pirn marker in the row has opposed sides defined by opposed arcuate cuts extending through the sheet, and the cuts are designed to create connection points at the ends of a line of joinder between pirn markers in the row. The end pirn markers in the row are connected to the sheet by a single, central connection point remote from the line of joinder between the end pirn marker and other pirn markers in the sheet.

20 Claims, 1 Drawing Sheet

PIRN MARKER SHEET AND METHOD FOR FORMING THE SAME

This application is a Continuation-in-Part application of U.S. Ser. No. 07/413,762 filed Sept. 28, 1989 now U.S. Pat. No. 4,944,978.

TECHNICAL FIELD

The present invention relates generally to circular markers for thread bearing cylinders or pirns, and more particularly to a pirn marker sheet construction which facilitates printing by a laser printer or similar means of a plurality of pirn markers which may then be separated from the sheet in a chain.

BACKGROUND ART

In the past, it has been a common practice to form either a web or a sheet of labels which can be printed as a group and then individually removed for use. U.S. Pat. No. 4,584,219 to H. R. Baantmans discloses such a web of labels which includes a web of carrier material with self-adhesive labels paced-apart thereon. Sheets of adhesive labels are disclosed by U.S. Pat. No. 4,619,851 to Y. Sasaki et al., U.S. Pat. No. 4,661,189 to P. A. Vay et al. and U.S. Pat. No. 4,690,720 to J. B. Mack.

Prior label web or sheet structures have commonly employed a carrier sheet upon which a group of labels are adhesively but removably mounted, and such labels are designed for individual removal from the carrier sheet.

In the fiber industry, as thread is formed, it is wound on cylinders or bobbins called pirns, each of which is provided at the end with a plastic holder to receive a removable pirn marker. This pirn marker is conventionally a doughnut-shaped circular cardboard piece which is retained in the plastic holder by friction, and which travels with the pirn until the thread is removed. The pirn marker is printed to identify the thread, the date it was made and the machine and station it came from. Once the thread is removed from the pirn, the pirn marker is removed and the pirn is then ready for reuse.

Unlike conventional labels, pirn markers have no adhesive and thus cannot be supported by a separate carrier sheet. Instead, they are formed from a sheet of cardboard which is relatively stiff so that the resulting marker is of sufficient stiffness to be retained by friction in the plastic holder on the pirn.

DESCRIPTION OF THE INVENTION

It is a primary object of the present invention to provide a novel and improved pirn marker sheet and method for forming the same wherein a plurality of rows of pirn markers are formed on a stiff sheet which can be directed through a printer.

Another object of the present invention is to provide a novel and improved pirn marker sheet having a plurality of columns or rows of interconnected pirn markers wherein each column or row may be easily removed as a unitary unit from the remainder of the sheet and the individual pirn markers may then be removed from the column or row for use.

A further object of the present invention is to provide a novel and improved pirn marker sheet having a plurality of rows of interconnected pirn markers which are defined by cuts in the sheet made at the periphery of each marker. These cuts are designed to permit effective feeding of the sheet through a printer and to facilitate subsequent removal of a row of markers from the sheet.

Yet another object of the present invention is to provide a novel and improved pirn marker sheet having a plurality of rows of pirn markers where the two end pirn markers in each row have a single connection point with the sheet at the respective end of the column. Each pirn marker in a row is joined to the next adjacent pirn marker or markers by spaced perforations cut through the sheet at the line of joinder. These spaced perforations provide a connection between the pirn markers in a row which is stronger than other single connection points connecting the row of pirn markers to the sheet.

Another object of the present invention is to provide a novel and improved pirn marker sheet having a plurality of columns or rows of pirn markers with the two end pirn markers in each column or row having a central connection point with the sheet at the respective end of the column or row. Opposed, arcuate cuts through the sheet on either side of central connection points define the end pirn markers. Each pirn marker intermediate the two end pirn markers is joined to a pirn marker at opposed top and bottom ends thereof by a line of spaced perforations cut through the sheet along the line of joinder. Each intermediate pirn marker is defined by opposed arcuate cuts through the sheet which, at one end of the marker begin at the ends of the line of perforations and which terminate at the other end of the marker a slight distance from the ends of the line of perforations to create a connection point with the sheet at either end of the line of perforations. Each said arcuate cut terminates at a point where, if the cut were continued along the line of the arc, it would join the line of perforations.

A further object of the present invention is to provide a novel and improved pirn marker sheet having a plurality of columns or rows of pirn markers defined by opposed arcuate cuts in the sheet which are spaced to provide intermediate connection points with the sheet. Each intermediate connection point is bounded by a cut which provides a boundary to prevent a tear occurring through the connection point from wandering away from the arcuate cuts beyond the boundary. The cuts bounding these connection points may be straight or a "V" shaped cut having an apex connected to the end of one arcuate cut segment and an open end adjacent to the spaced opposed end of an arcuate cut segment.

BEST MODE FOR CARRYING OUT THE INVENTION

Figure 1:
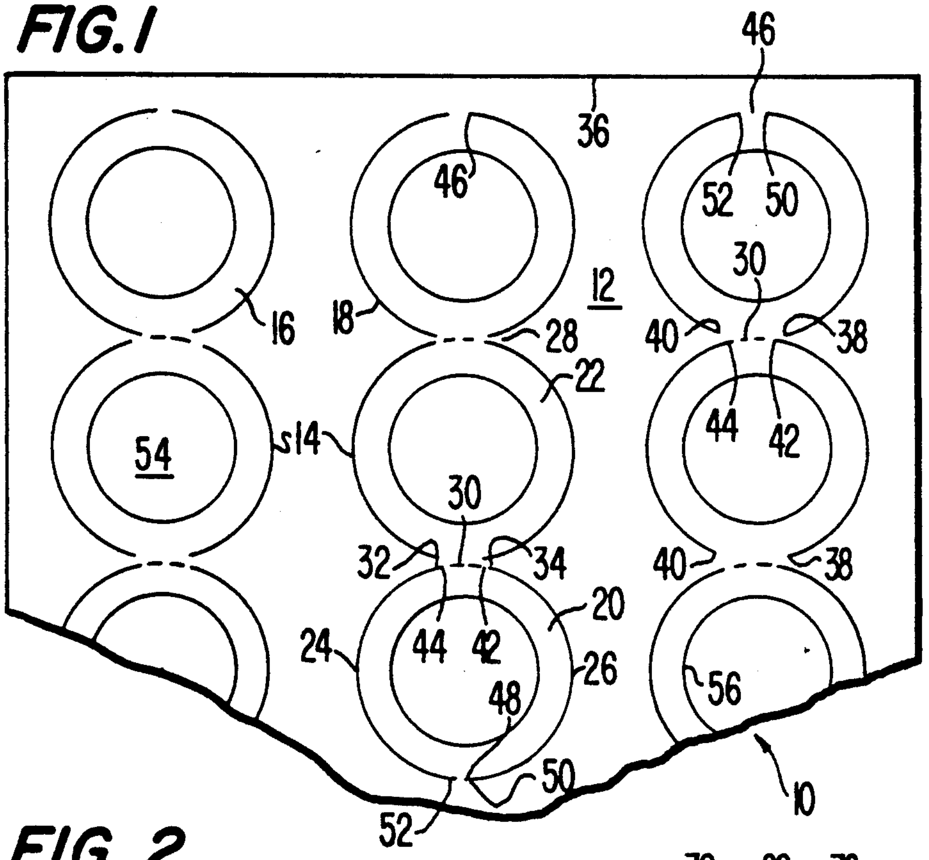
FIG. 1 is a plan view of the pirn marker sheet of the present invention.

Referring now to FIG. 1; the pirn marker sheet of the present invention indicated generally at 10 consists of a sheet 12 of cardboard, posterboard or similar sheet material having sufficient flexibility to permit the sheet to pass through a printer, such as a laser printer, while being stiff enough to permit pirn markers formed from the sheet to be retained by friction in a plastic holder. The sheet 10 includes a plurality of columns or rows 14 formed of interconnected pirn markers 16 which are retained in the plane of the sheet. Each row includes end pirn markers 18 and 20 and one or more intermediate pirn markers 22, all of which are substantially circular in configuration. The pirn markers 18 are the lead pirn markers and form the first marker to be grasped and pulled upwardly to remove a row 14 from the sheet 12.

Each pirn marker has a circular outer periphery, a significant portion of which is defined by two spaced, opposed arcuate cuts 24 and 26 which extend completely through the sheet 12. These arcuate cuts are unbroken and provide smooth side surfaces for the pirn marker to facilitate its insertion and retention by the plastic holder on a pirn.

Each intermediate pirn marker 22 is connected to two adjacent pirn markers by a juncture 28. A line of spaced perforations 30 extends along each juncture 28 with the perforations being cut through the sheet 12. A juncture connection point 32 and 34 is provided at the ends of each line of perforations.

The junction connection points 32 and 34 connect two adjacent pirn markers to the sheet 12 and hold these pirn markers in the plane of the sheet during printing. Additionally, the juncture connection points are formed to facilitate detachment of a complete row 14 of interconnected pirn markers from the sheet 12 if the end pirn marker 18 closest to the leading edge 36 of the sheet is grasped and pulled outwardly from the plane of the sheet.

To form the juncture connection points 32 and 34 at a juncture 28 between two pirn markers, the arcuate cuts 24 and 26 for the pirn marker closest to the leading edge 36 terminate at first juncture terminal points 38 and 40 spaced laterally and outwardly from the ends of the line of perforations 30. These first juncture terminal points are positioned in close proximity to the ends of the line of perforations in a position where, if the cut were continued along an arcuate line past a first terminal point, it would join the line of perforations at one end thereof. The arcuate cuts 24 and 26 for the pirn marker farthest from the leading edge 36 terminate at second juncture terminal points 42 and 44 at the ends of the line of perforations 30.

Each intermediate pirn marker 22 includes second juncture terminal points 42 and 44 on a side closest to the leading edge 36 and first junction terminal points 38 and 40 on an opposite side furthest removed from the leading edge 36 of the sheet 12. Also, each end pirn marker 18 and 20 is joined to the sheet 12 by a single connection point 46 and 48, respectively. The arcuate cuts 24 and 26 for the end pirn markers 18 and 20 terminate at third terminal points 50 and 52 on either side of the single connection points 46 and 48.

To form the pirn marker sheet 10, an uncut sheet of material is fed into a roller type cutter of a conventional type which has raised blades to form the arcuate cuts 24 and 26 as well as the perforations 30. Also, the raised blades can be formed to remove the center from each pirn marker 16 as indicated at 54. This is normally done by providing a complete circular cut along a line 56. It is to be understood, however, that the pirn markers may take other forms than the substantially doughnut shape of FIG. 1. For example, the pirn markers may be formed without holes, or in which cut 56 is a perforation allowing subsequent removal of the central portion to define a hole. In addition, the pirn markers may have holes which are substantially smaller than those of FIG. 1 and the holes may be offset to allow additional space for printed information, such as large multi-digit numbers.

The sheet 12 passes from the cutter in the form illustrated in FIG. 1 with a plurality of interconnected pirn markers 16 having open centers 54 connected to the sheet by connection points 32,34 and 46,48. The leading edge 36 of the sheet is fed into a laser or similar printer, and information is printed on each individual pirn marker 16. Then the sheet 10 is ready for use.

The pirn marker sheet 10 is specifically designed so that a user can grasp an end pirn marker 18 close to the leading edge 36 and by breaking the connection point 46 and pulling the end pirn marker upwardly from the sheet as viewed in FIG. 1, remove a complete column or row 14 of interconnected pirn markers from the sheet without tearing or breaking a pirn marker in the column. This is accomplished due to the novel construction of the connection points 32 and 34 which tear away in a direction in toward the perforations 30 due to the location of the termination points 38 and 40 and the fact that the line of perforations creates a connection between pirn markers which is stronger than the connection formed between pirn markers and the sheet 12 by connection points 32,34 and 46,48. Even where the strength between adjacent pirn markers is less than the strength between the pirn markers and the sheet, adjacent pirn markers will remain connected as they are pulled from the sheet due to the orientation of the forces associated with pulling the markers from the sheet 12. Since termination points 38,40 are spaced outwardly from termination points 42,44; the tear from points 38,40 will not stray but rather will connect with arcuate portions 24,26 as the pirn markers are pulled from the sheet 12. No stress is placed on a pirn marker which would cause it to tear, and no outward tearing into the sheet 12 occurs.

Once a row of pirn markers is removed, individual markers may be separated along the lines of perforations 30 and snapped into the holder at the end of a pirn.

With the pirn marker sheet 10 of FIG. 1, it is important for the leading edge 36 to be the first edge into a printer, for if a side edge of the sheet is mistakenly inserted, the opposed arcuate cuts 24 and 26 could permit a pirn marker 16 to bend above the plane of the sheet and jam the printer. This makes it important to arrange the pirn markers in vertical columns extending downwardly from the leading edge 36 as shown in FIG. 1 for the configuration illustrated does not readily facilitate the arrangement of the pirn markers in horizontal rows across the sheet. To effectively accomplish a horizontal arrangement, it is necessary to provide intermediate connection points between a pirn marker and the sheet 10 along the arcuate cuts 24 and 26 to hold the pirn marker in the plane of the sheet. However, when connection points similar to the connection points 46 and 48 are used at the sides of a pirn marker, they have a strong tendency, when tearing, to tear into the pirn marker rather than following the arcuate cuts 24 and 26.

Figure 2:
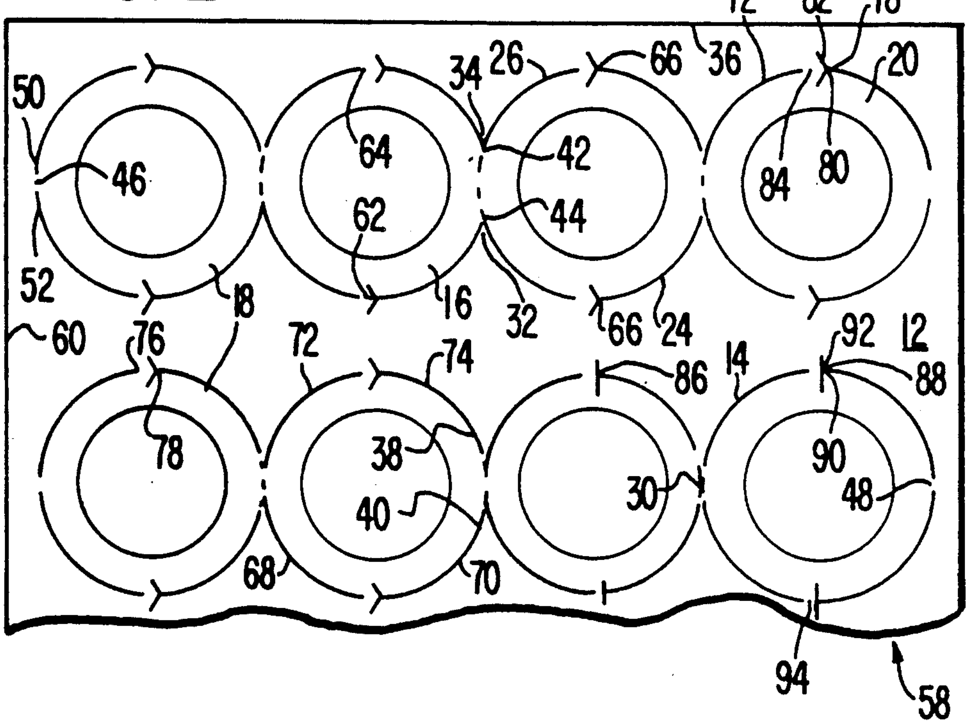
FIG. 2 is a plan view of a second embodiment of the pirn marker sheet of the present invention.

With reference to FIG. 2, a modified pirn marker sheet 58 is provided where the pirn markers 16 can be effectively arranged in vertical columns as shown in FIG. 1, or in horizontal columns parallel to the leading edge 36 as shown in FIG. 2. In FIG. 2, like reference numerals will be used to designate structure identical to that shown and described in connection with the pirn marker sheet 10 of FIG. 1.

When the pirn markers are arranged across the sheet, as shown in FIG. 2, a row 14 is removed by grasping a pirn marker 18 close to a side edge 60 of the sheet, lifting this pirn marker up and tearing across to the end pirn marker 20. It will be noted that each pirn marker is provided with intermediate connection points 62 and 64 with the sheet 12 located midway along the arcuate cuts 24 and 26 respectively. These intermediate connection points permit the leading edge 36 of the sheet 12 to be fed into a printer without danger of a printer jam due to a pirn marker rising above the plane of the sheet 12. In fact, now any edge of the sheet 12 could be inserted into a printer either purposely or accidentally without the danger of incurring a printer jam.

As previously indicated, if only the connection points 62 and 64 were provided on each pirn marker, there would be a likelihood that a "wandering tear" will occur when the row 14 is removed from the sheet 12. A slight twist in the row of pirn markers as it is pulled upwardly from the sheet can cause a tear to occur outwardly into the sheet or inwardly into the pirn marker at the connection points 62 and 64. This occurrence of a "wandering tear" is precluded by the structure shown in FIG. 2 where a "V" shaped cut 66 through the sheet 12 is provided at each connection point 62 and 64.

The connection point 62 preferably divides the arcuate cut 24 into two sections 68 and 70 of substantially equal length while the connection point 64, which is preferably aligned with the connection point 62, preferably divides the arcuate cut 26 into two sections 72 and 74 of substantially equal length. The open end 76 of each "V" shaped cut faces toward the edge 60 closest to the lead pirn marker 18, while the apex 78 of each "V" shaped cut is connected to the end of a section of either the arcuate cut 24 or 26 and points in the direction that a row of pirn markers is torn to remove the row from the sheet. Thus, in FIG. 2, it will be noted that the apex 78 of each "V" shaped cut is connected to either an arcuate cut section 70 or 74, while the open end of each "V" shaped cut encompasses the end of either an arcuate cut section 68 or 72, with the "V" shaped cut angling outwardly on either side and in spaced relationship to the ends of the sections 70 and 74. Thus, when the row of pirn markers is torn from the sheet 12, each "V" shaped cut directs the tear of the connection points 62 and 64 toward the apex 78, and a "wandering tear" is thereby prevented.

Each "V" shaped cut may be formed with legs 80 and 82 of equal length extending from an apex 78, and the distance across the space 84 between the end of the arcuate section 72 and the apex is equal to, or less than, the length of the legs 80 and 82.

It is anticipated that cuts of other shapes could be used in place of the "V" shaped cuts 66, such as arcuate "U" shaped cuts or a square cornered "U" shaped cut. In each instance, the open end of the cut would encompass the end of the section 68 or 72 and the closed end would be attached to the section 70 or 74.

In FIG. 2, a simple straight cut 86 which has proven effective is also shown as an alternative to the "V" cuts 66. Each such straight cut has a center point 88 which is connected to the end of either an arcuate cut section 70 or a section 74. This leaves cut legs 90 and 92 which extend outwardly on either side beyond the ends of the arcuate cut sections 68 and 72. Again, ideally the distance across the space 94 forming the connection point is no greater than the length of the legs 90 or 92.

INDUSTRIAL APPLICABILITY

The pirn marker sheets 10 or 58 are formed in a manner which will facilitate feeding of the sheet through a laser or similar printer so that all pirn markers on the sheet can be printed. Then a row of pirn markers may be easily removed from the sheet and individual pirn markers with smooth sidewalls are provided which can be removably snapped into a holder at the end of a pirn.

What is claimed:

1. A sheet of circular pirn markers which are removable from the remainder of the sheet as an interconnected row of pirn markers comprising a sheet of material having at least one row of pirn markers formed therefrom and connected thereto, said row including first and second end pirn markers and one or more intermediate pirn markers therebetween, each end pirn marker being connected at one side thereof along a line of joinder to an intermediate pirn marker and at an opposite side thereof by an end connection point to the remainder of said sheet, each such end and intermediate pirn markers having opposed sides defined by opposed arcuate cuts extending through said sheet, said opposed arcuate cuts being spaced to provide at least one additional intermediate connection point between each pirn marker and the sheet.

2. The sheet of claim 1, wherein said opposed arcuate cuts terminate at spaced terminal points on opposite sides of each such pirn marker to form at least two, opposed spaced intermediate connection points and at least a pair of spaced joinder terminal points.

3. The sheet of claim 2, wherein each intermediate pirn marker is connected to each of two adjacent pirn markers along lines of joinder positioned between said joinder terminal points.

4. The sheet of claim 3, wherein a line of spaced perforations is provided along each of said lines joinder.

5. The sheet of claim 4, wherein opposed arcuate cuts for each said intermediate pirn marker extend from first spaced joinder terminal points at the ends of said line of perforations on a first side of said intermediate pirn marker and from second spaced joinder terminal points each spaced laterally and outwardly from the end of said line of perforations at a second side of said intermediate pirn marker.

6. The sheet of claim 5, wherein each of said opposed arcuate cuts of said intermediate pirn markers, if extended beyond said second spaced joinder terminal points, would extend into the opposite ends of a line of perforations.

7. The sheet of claim 6, wherein opposed arcuate cuts for said first and second end pirn markers extend from opposite sides of said end connection point.

8. The sheet of claim 4, wherein at each line of juncture between an intermediate pirn marker and an adjacent pirn marker the opposed arcuate cuts for one of said pirn markers joined at the line of juncture extend from first spaced juncture terminal points at the ends of said line of perforations and the opposed arcuate cuts for the remaining pirn marker extend from second spaced juncture terminal points each spaced laterally and outwardly from the ends of said lines of perforation to form spaced juncture connection points between the remaining pirn marker and the sheet, one at each end of a line of perforations.

9. The sheet of claim 8, wherein said line of perforations is formed to provide a connection between two adjacent pirn markers which is stronger than the connection with said sheet provided by the juncture connection points.

10. The sheet of claim 9, wherein the opposed arcuate cuts for said first and second end pirn markers extend from opposite sides of a single end connection point.

11. The sheet of claim 10, wherein each said second spaced terminal point is located in close proximity to an end of a line of perforations.

12. The sheet of claim 11 wherein an opening is formed in each said pirn marker.

13. The sheet of claim 1 wherein one of said end pirn markers is a lead pirn marker to be removed first from said sheet, said opposed arcuate cuts being spaced to provide at least two segments having spaced ends to form an intermediate connection point therebetween, and a connection cut is formed in said sheet having an open end, the connection cut being connected to the end of one of said segments with the open end being positioned adjacent to the end of the remaining segment.

14. The sheet of claim 13 wherein said open end of the connection cut is positioned to point toward the end connection point of said lead end pirn marker.

15. The sheet of claim 14 wherein said opposed arcuate cuts are spaced to provide at least two segments having spaced ends on each side of said pirn marker with at least two opposed intermediate connection points, one on each side of said pirn marker.

16. The sheet of claim 15 wherein each said connection cut is connected to the end of the segment of an arcuate cut which is on the side of the intermediate connection point farthest removed from the end connection point of said lead pirn marker.

17. The sheet of claim 16 wherein said connection cut includes a straight cut having first and second legs which extend outwardly on either side of the end of the segment of the arcuate cut to which the connection cut is connected.

18. The sheet of claim 16 wherein said connection cut is a "V" shaped cut having an apex connected to the end of the segment of the arcuate cut to which the connection cut is connected and first and second legs which incline outwardly from the apex on either side thereof.

19. The sheet of claim 18 wherein the distance between the spaced ends of the two segments of the arcuate cut which defines an intermediate connection point is no greater than the length of said first or second leg, said first and second legs being of equal length.

20. The sheet of claim 17 wherein the distance between the spaced ends of the two segments of the arcuate cut which defines an intermediate connection point is no greater than the length of said first or second leg, said first and second legs being of equal length.

* * * * *